May 15, 1962 P. K. GILOTH 3,034,228
VECTORING PHASE SIMULATOR
Filed July 30, 1958 3 Sheets-Sheet 1

$R = X \sin\alpha + Y \cos\alpha$
$X \cos\alpha = Y \sin\alpha$

INVENTOR
PAUL K. GILOTH
BY R.J. Tompkins
ATTORNEY

May 15, 1962 P. K. GILOTH 3,034,228
VECTORING PHASE SIMULATOR
Filed July 30, 1958 3 Sheets-Sheet 3
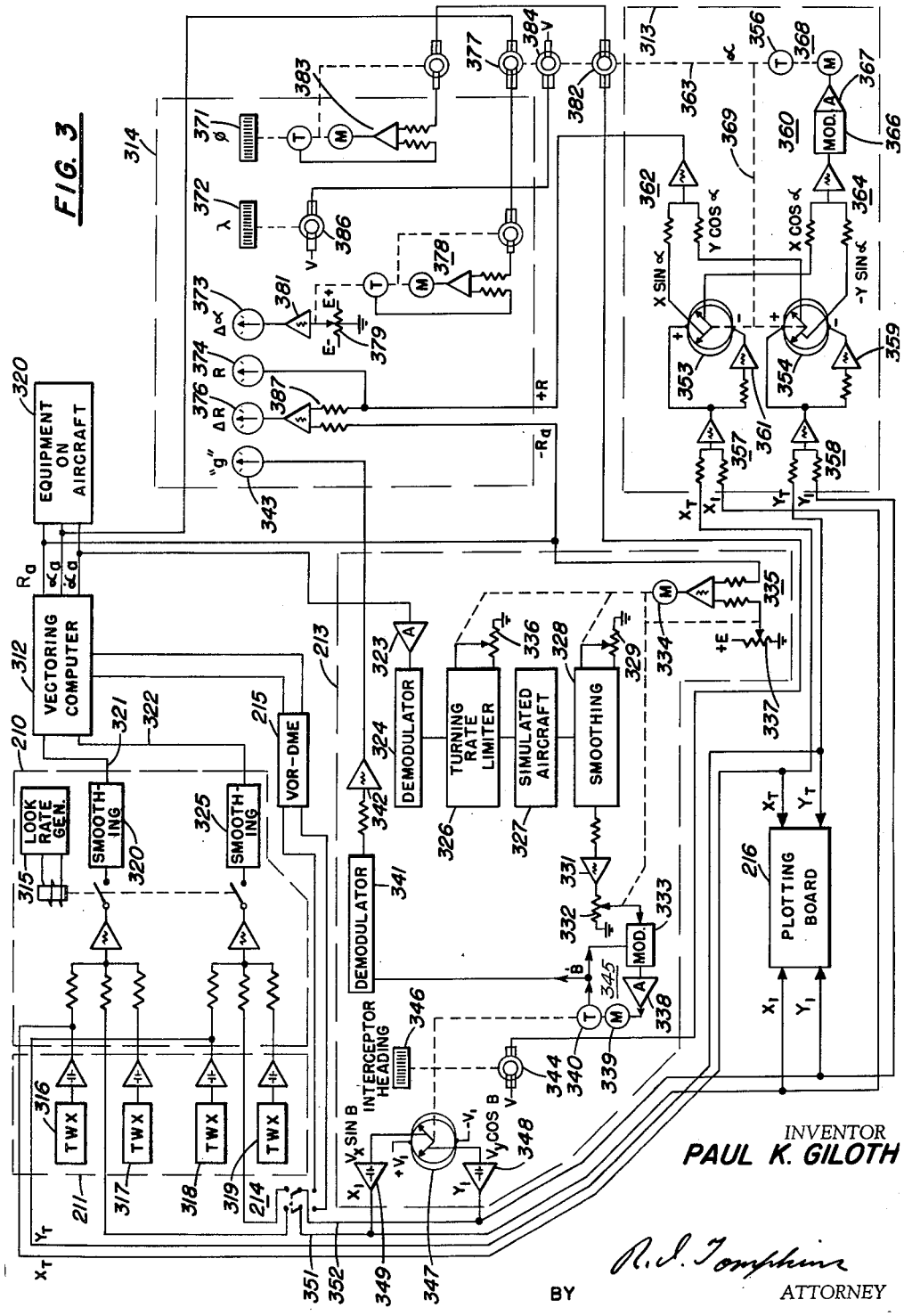
INVENTOR
PAUL K. GILOTH
ATTORNEY United States Patent Office 3,034,228
Patented May 15, 1962

3,034,228
VECTORING PHASE SIMULATOR
Paul K. Giloth, Whippany, N.J., assignor, by mesne assignments, to the United States of America as represented by the Secretary of the Navy
Filed July 30, 1958, Ser. No. 752,150
9 Claims. (Cl. 35—10.2)

The present invention relates to vectoring phase simulators and more particularly to vectoring phase simulators which are instrumented to allow evaluation of a proportional navigation system as a function of its parameters at vraious AI (Aircraft Interception) lock-on ranges.

As AI detection ranges are limited by practical considerations a vectoring system is necessary to direct the interceptor until the AI radar can detect and track the target. The computer will direct the interceptor to the optimum position in space so that the AI radar can detect and track the target. To increase the effectiveness of the AI radar the information derived from the vectoring computer is used to point the AI radar antenna along the line-of-sight to the target and to provide automatic positioning of the radar range gate. This will cause the detection and lock-on ranges of the AI radar to be increased and a smaller sector scan can be used in place of the present wide angle scan. Therefore, the present invention offers automatic control of the interceptor with longer detection and lock-on range for the AI radar.

In copending application Serial No. 635,079, filed January 18, 1957, now Patent #2,971,269, entitled "Vectoring Phase Simulator" I have disclosed a simulator for evaluating and optimizing the characteristics of manual, semiautomatic and automatic interceptor vectoring systems. The present invention is an improvement over that system and provides an improved interceptor position generator, a true position computer and improved instrumentation.

The present invention is a device for simulating aircraft or missile interceptions in real time and with either simulated or actual input data and equipment. Since the system is an analog and operates in real time, actual radar data can replace the simulated radar; actual computers, aircraft and data links can be incorporated in the system.

However, the primary use of the invention is to simulate intercept problems without real hardware and to optimize system parameters. The simulator is arranged to run a preselected number of problems automatically and to automatically record all data on the plotting boards and on film. Noise is random and each successive interception in a set would differ only by random noise samples, all other parameters being held constant. The system is flexible and permits a wide variety of target and interceptor speeds, target maneuvers, data rates, etc. In all essential aspects the simulator represents a complete closed loop control system and provides the necessary auxiliary equipment to record and evaluate the results.

The essential characteristics of all major components are simulated. The main units comprise teletypewriter apparatus, a plotting board, the computing equipment and a power supply. The input devices to the computer consist of teletypewriter transmitters and manually positioned potentiometers as shown and described in copending application Serial No. 635,079, now Patent #2,971,269. Target course generators, random data error generators, search radar simulator, storage, sampling, ground-to-air data link and the automatic operation of the machine are controlled by the punched tapes used with the teletypewriter machines. Various system constants are introduced by precision potentiometers.

The computer section of the simulator consists of operational amplifiers and servo-mechanisms. Storage, quantizing, sampling and prediction are provided to permit simulation of track-while-scan, data quantization, data storage and conversion of discrete data from the teletypewriter machines to analog form. Two computers are used, one to compute the solution from perfect continuous data and a second to compute a solution from radar data which is intermittent and has errors. Comparison of the two solutions permits evaluation of interceptor position and heading at any time during the simulation.

The output devices consist of a plotting board to provide a space plot of the interception and an automatically photographed data panel with dials and meters which present all the necessary information for evaluating each vectoring run.

The programming of the simulator is accomplished by use of a patch board for interconnecting components for a particular vectoring system. The simulator is controlled and "sequenced" by teletypewriter tapes, and can be arranged to run through a desired number of interceptions and then stop automatically. The parameters are usually held fixed for a set number of runs, the only variable being the random data error.

The target course is generated by a course generator which can provide any arbitrary course with superimposed data error. The radar simulator simulates the search radar scan rate and blip scan ratio. A data quantizer is available for quantizing search radar data to simulate data transmission devices such as the Lincoln Slowed-Down Video System. Track-while-scan channels are available which may be operated either as single-mode or bimodal systems. The smoothed predicted position and rate data are fed to the predicted-collision computer which computes the collision heading of the interceptor. The computed order is sampled and stored to simulate either a time-shared analog computer or a digital computer. The surface-to-air data link is also simulated by a sampling and storage device. The ordered heading is compared with the actual heading of the interceptor to develop steering orders, which are limited and then fed to the simulated automatic flight control and interceptor aircraft.

The output of the simulated aircraft is the interceptor position in rectangular coordinates. This position is fed to the radar simulator, closing the control loop at the time radar data are provided. The vectoring system thus is a sampled servo with a number of components in the main loop, each having its own minor feedback loop. Techniques similar to those used for analyzing the stability of servomechanisms have been used to determine stable gain settings for the main control loop.

The simulator then comprises essentially a target position generator, a radar simulator, a vectoring computer, an interceptor position generator, a true position computer and a plotting board where the tracks of the target and the interceptor are displayed. The various components are coupled together by appropriate data transmission links, not shown. In addition to the plotting board, appropriate display indicators are provided which may be photographed.

Accordingly, it is an object of the present invention to provide a vectoring phase simulator whereby optimum vectoring methods may be determined.

It is another object of the present invention to provide a vectoring phase simulator whereby the optimum form of a vectoring system and the optimum parameters thereof may be determined.

A further object of the present invention is to provide a simulator for simulating aircraft or missile interception in real time and with either simulated or actual input data and equipment.

A more specific object of the present invention is to provide a vectoring phase simulator which is instrumented to allow evaluation of a proportional navigation system as a function of its parameters at various AI lock-on ranges.

Other objects and many of the attendant advantages of this invention will be readily appreciated as the same becomes better understood by reference to the following detailed description when considered in connection with the accompanying drawings wherein:

FIG. 3 illustrates an embodiment of the invention partly in schematic and partly in block diagram form.

Figure 1:
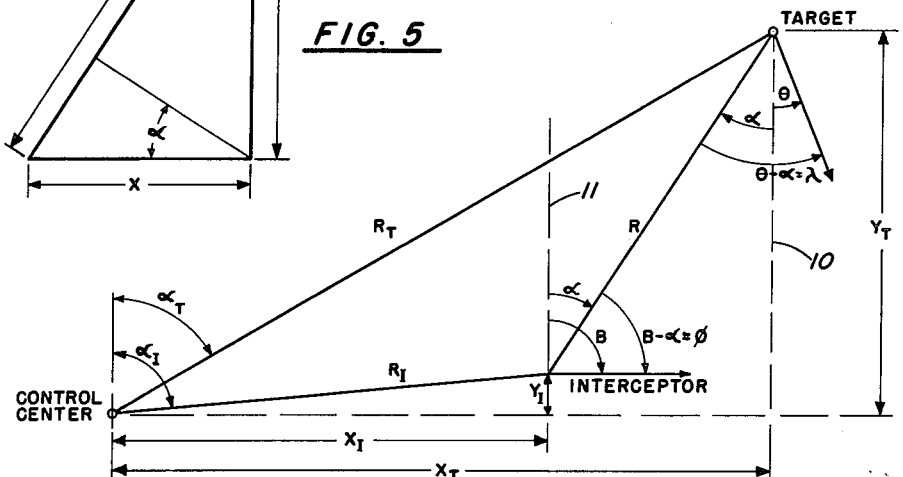
FIG. 1 is a vector diagram illustrating the geometry of the interception problem.

The geometrical aspects of the problem are represented by FIG. 1. The control center is shown as the origin of the coordinate system. The target is located at an angle $\alpha_T$ and range $R_T$ from the center and has a heading angle of $\theta$ from its reference 10. The interceptor is located at angle $\alpha_I$ and range $R_I$ from the center and has a heading angle B from its reference 11. R and $\alpha$ represent respectively the range and angle of the target with respect to the interceptor. $\lambda$ is the heading angle of the target from the line of sight between the interceptor and target. This angle is the sum of angles $\theta$ and $\alpha$. $\phi$ is the heading of the interceptor referred to the line of sight between the interceptor and target. As may be seen from FIG. 1, the position of the target may be expressed in rectangular coordinates as $X_T$ and $Y_T$, while the position of the interceptor may be expressed in rectangular coordinates as $X_I$ and $Y_I$.

Figure 2:
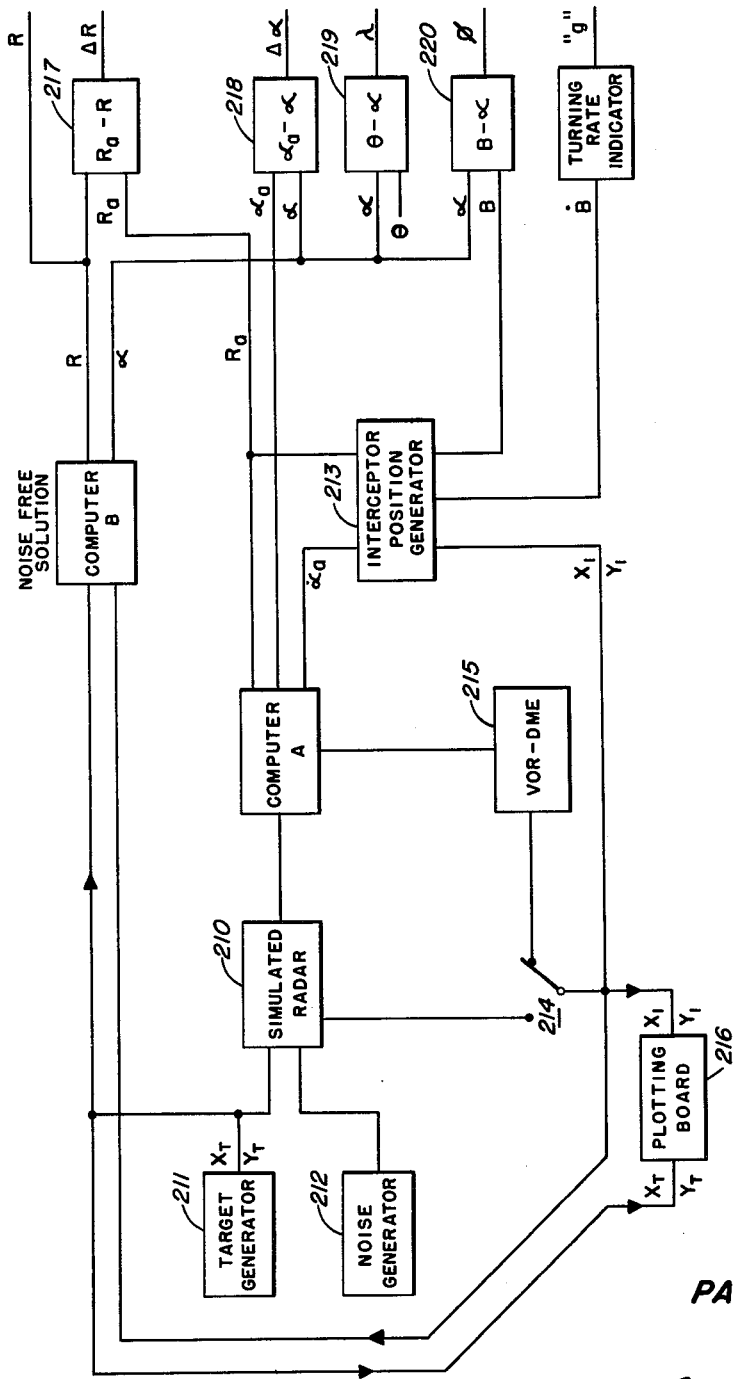
FIG. 2 illustrates an embodiment of the invention in block diagram form.

Referring now to FIG. 2 there is shown a simplified block diagram of the simulator system. Simulated radar 210 receives input signals from target generator 211, noise generator 212 and interceptor position generator 213. The signals received by simulated radar 210 are interrupted by a switching arrangement, including look rate generator 315 (FIG. 3), to simulate the operation of a search radar. The output of simulated radar 210 is therefore a series of steps which appear to be look intervals of a radar. Each step represents the change in position of the target and interceptor between looks. Computer A is a proportional navigation vectoring computer and from the series of steps or pulses received from simulated radar 210 computes the line-of-sight range between target and interceptor, $R_a$, the angle of the line-of-sight between target and interceptor, $\alpha_a$, and the rate of change of the angle of the line-of-sight between target and interceptor, $\dot{\alpha}_a$. Interceptor position generator 213$\alpha$ receives the signal $\dot{\alpha}_a$ from computer A and generates$\dot{\alpha}$ three signals, interceptor position, $X_I$, $Y_I$, interceptor heading, B, and the turning rate of the interceptor $\dot{B}$. As the geometry of the problem causes $\dot{\alpha}_a$ to vary inversely with range, the range output signal $R_a$ is coupled as an input to the interceptor position generator 213 to vary its gain directly with range. By selector switch 214 simulated radar 210 may be used to obtain position data of the interceptor or the interceptor may in simulation determine its own position with the VOR-DME equipment 215.

Two sources of data are provided by the simulator. A plotting board 216 which plots target and interceptor courses is the first source and a data panel which provides data on $\lambda$, $\phi$, R, $\Delta\alpha$ and $\Delta R$ is the second. $\Delta\alpha$ and $\Delta R$ are the errors in computed angle and range respectively of the line-of-sight between the interceptor and target. These errors are due to the presence of radar noise in computer A.

Angles $\lambda$ and $\phi$ may be measured from the plots but the accuracy of the measurements are questionable and the process is time consuming. In order to obtain $\lambda$, $\phi$, $\Delta\alpha$ and $\Delta R$ automatically a second computer, computer B, which is a proportional navigation computer computes a noise free or true solution of $\alpha$ and R. $\Delta R$, $\Delta\alpha$, $\lambda$ and $\phi$ are obtained by summing devices 217, 218, 219 and 220 respectively. The output signal B from interceptor position generator 213 is coupled to a turning rate indicator 221 which is calibrated to read in "$g$," the acceleration in the plane of the turn stated as a multiple of the 32.2 ft./sec.$^2$ acceleration due to gravity. It will be noted that FIG. 2 shows two computers designated as "computer A" and "computer B," the latter being indicated as giving a noise-free solution. (These two computers correspond, respectively, to computers 312 and 313 of FIG. 3.) Computer A yields the range $R_a$ and the angle $\alpha_a$ of the target with respect to the interceptor. Both outputs $R_a$ and $\alpha_a$ include simulated radar noise supplied to the simulated radar unit 210 by noise generator 212. As this generator supplies no noise to computer B, its outputs R and $\alpha$ are noise-free. The difference $\Delta R = R_a - R$ and the difference $\Delta\alpha = \alpha_a - \alpha$ are errors due to radar noise.

Referring now to FIG. 3 there is shown a target position generator 211, a simulated radar 210, vectoring computers 312 and 313, an interceptor position generator 213, a commercial type plotting board 216 having a pair of two coordinate plotting pen carriages, VOR-DME equipment 215 and a data display panel 314.

The target position generator 211 comprises programmed teletype operated units 316, 317, 318, and 319 to provide signals representing the instantaneous position of a target expressed in rectangular coordinates and signals proportional to random fluctuations in the position of a target (radar noise). Units 316 and 318 provide the noise-free output of target position while units 317 and 319 provide the random fluctuations in the position of a target (radar noise). The noise-free output of target position generator 211 is applied to one pen carriage of plotting board 216 and as inputs to computer 313.

Simulator 210 receives information of target position from target generator 211 and interceptor position information from interceptor position generator 213. The information received is sampled with look rate generator 315 to simulate the operation of a search radar. As described in application Serial No. 635,079 the output of radar simulator 210 is a series of steps of look interval duration, each step representing the change in position of the target and interceptor between looks. Smoothing devices or filters 320 and 325 are used to remove the quantizing effect of the look interval.

The output from radar simulator 210 is coupled to the input of vectoring computer 312 by leads 321 and 322.

Vectoring computer 312 is described in copending application Serial No. 635,078 for Proportional Navigational Computer, filed January 18, 1957.

Computer 312 computes $R_a$, $\alpha_a$, and $\dot{\alpha}_a$ (FIG. 3) with respect to the interceptor. These outputs are coupled to the equipment on aircraft box 320 for pointing the antenna of the AI radar (part of equipment on aircraft) and positioning the range gate, not shown. The rate of change of the angle of the line-of-sight is coupled as an input to A.C. amplifier 323. The output of amplifier 323 is demodulated by demodulator 324. This demodulated signal is coupled to limiter 326 which limits the signal coupled to aircraft simulator 327. The purpose of limiter 326 is to prevent the simulated aircraft from attaining turning rates beyond the capabilities of the actual aircraft. Limiter 326 is a direct current limiter which cuts off sharply and is adjustable. Any of several types may be used, but a sharp cut off diode limiter of the bridge type is preferred. The simulated aircraft signal is smoothed in smoother 328 which is a simple exponential filter which is used to filter the steering order signals to reduce the effect of erroneous target position data. Since more delay can be tolerated at longer range, smoother 328 is made range variable by variable resistor 329 and its delay can be varied from 2 to 10 seconds.

Figure 4:
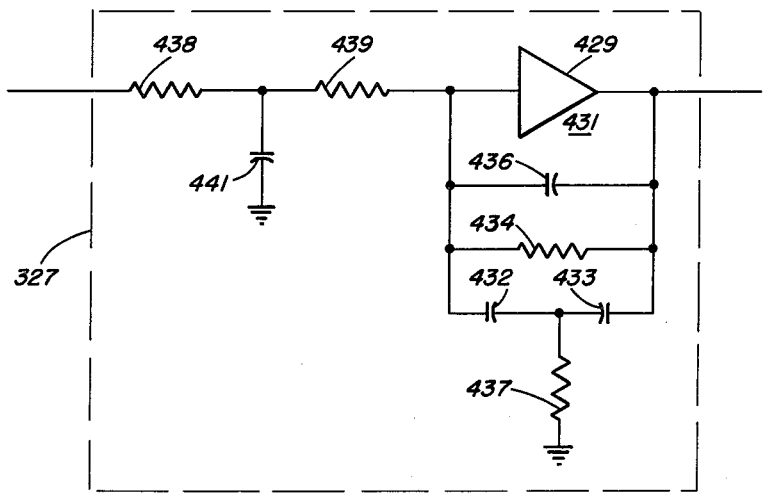
FIG. 4 illustrates the simulated aircraft shown in block diagram form in FIG. 3.

Simulated aircraft 327 (see FIG. 4) consists of a single amplifier 429 and a passive network 431. Network 431 consists of series connected capacitors 432 and 433 connected in parallel with resistor 434 and capacitor 436. Resistor 437 is connected intermediate capacitors 432, 433 and ground. The input signal is coupled through a filter network consisting of resistors 438, 439 and capacitor 441. Thus by this circuitry the network of FIG. 4 is formed having a purpose merely to simulate the transient response of the aircraft to a received turning order signal. The output signal from simulated aircraft 327 is coupled through operational amplifier 331 and variable resistor 332 to modulator 333 which comprises a part of the servomechanism 333, 338, 339, and 340, the output of the shaft of motor 339 being angle B. Motor 339 acts to integrate the turning order B (which, for proportional navigation, is developed from the expression $B = K\dot{\alpha}_a$) to give the heading angle B of the interceptor.

The rate of change of the line-of-sight $\dot{\alpha}_a$, is combined with a navigation constant to give aircraft steering orders. This constant is introduced by varying the tap on variable resistor 332. As the geometry of the problem causes $\dot{\alpha}_a$ to vary inversely with range, the navigation constant is made to vary directly with range by means of servo motor 334 driving the variable tap of resistor 332. The range signal output from computer 312 is coupled as the input to motor 334 through servo-amplifier 335. Also mechanically coupled to the output of motor 334 are the variable taps of resistors 329, 336, and 337. The output signal of modulator 333 is amplified by amplifier 338 and is coupled to the input of motor 339. Tachometer 340 is driven by motor 339 and generates an alternating current voltage whose amplitude is proportional to the turning rate of the interceptor, B. The amplitude modulated voltage is demodulated in demodulator 341 and coupled through operational amplifier 342 to drive a meter 343 which is calibrated to read in "g" for a particular interceptor velocity.

The aircraft turning rate B is integrated by velocity servo 345 which comprises modulator 333, amplifier 338, motor 339, and tachometer 340 to give an aircraft heading on indicator 346. The integrated output of servo loop 345 is the shaft output of motor 339 and tachometer 340 which is mechanically coupled to indicator 346, sine-cosine potentiometer 347 and synchro torque transmitter 344. Transmitter 344 electrically transmits B as an input to differential synchro 382. The heading angle, B, is resolved into rectangular coordinates by means of a sine-cosine potentiometer 347. The magnitude of the interceptor velocity is introduced as constant voltages, $+V_I$ and $-V_I$, to the sine-cosine potentiometer. The velocities in each coordinate are integrated by integrators 348 and 349 to give interceptor position.

At this point the system has two possible variations. The search radar may be used to obtain position data of the interceptor or the interceptor may determine its own position with VOR/DME equipment. This is done by either connecting leads 351 and 352 to Radar simulator 210 or VOR/DME, 215, by means of switch 214. When the interceptor position data is fed to radar simulator 210, the steering loop is closed.

In order to evaluate the solutions of computer 312 based on noisy radar input signals, computer 313 is used to compute solutions based on noiseless input signals and then a comparison is made of the two solutions. Computer 313 computs the actual position, heading and line-of-sight on a continuous basis.

Computer 313 comprises two sine-cosine potentiometers 353 and 354. The wiper arms of potentiometers 353 and 354 are coupled to the shaft of tachometer 356 for conjoint rotation therewith. Summing amplifiers 357, 358 and direct current amplifiers 359, 361 are provided to couple the coordinate position of the target and interceptor from target generator 211 and interceptor position generator 213 to sine-cosine potentiometers 353 and 354. Summing amplifier 362 combines the outputs from sine-cosine potentiometers 353 and 354 and provides an output which is the actual range, R, to the target from the interceptor. The actual angle, α, of the target from the interceptor is provided at the output shaft 363 of the servo-loop 360 comprising summing amplifier 364, modulator 366, amplifier 367, motor-tachometer set 368 and shaft 369.

In describing the operation of 313, reference will be made to FIG. 5. Amplifier 357 produces an output voltage which is proportional to $X_T - X_I$. This voltage is X and is applied directly and through direct current amplifier 361 to sine-cosine potentiometer 353 which produces output voltages proportional to $X \sin \alpha$ and $X \cos \alpha$. Amplifier 358 produces an output voltage which is proportional to $X_T - Y_I$. This voltage is applied directly and through direct current amplifier 358 to sine-cosine potentiometer 354 which produces output voltages proportional to $Y \cos \alpha$ and $-Y \cos \alpha$.

Figure 5:
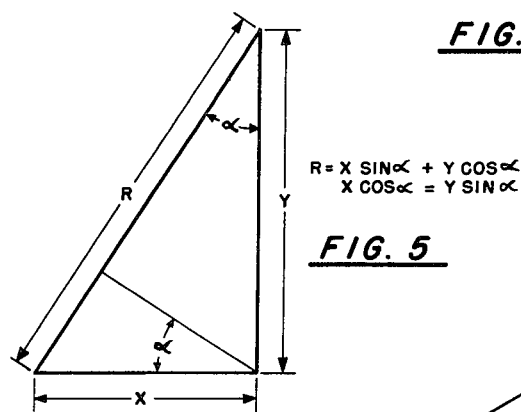
FIG. 5 is a diagram which illustrates the geometry of the problem in solving for the quantities B and $\alpha$.

It is seen from FIG. 5 that $R = X \sin \alpha + Y \cos \alpha$, therefore, $X \sin \alpha$ and $Y \cos \alpha$ are added directly in amplifier 362 to obtain R. It is also seen from FIG. 5 that $X \cos \alpha = Y \sin \alpha$, then $X \cos \alpha - Y \sin \alpha = 0$. $X \cos \alpha$ and $Y \cos \alpha$ are added in amplifier 364. Servo-loop 360 is set so that the output of amplifier 364 will reduce to zero when the equation, $X \cos \alpha - Y \sin \alpha = 0$, is satisfied. The output of amplifier 367 drives motor tachometer-generator set 368 to thereby provide a shaft output proportional to the instantaneous value of α.

Two sources of data are provided by the simulator. A plotting board 216 which plots target and interceptor courses and photographs of a data panel 314 which provides data on the heading angle of the target from the line-of-sight, λ; heading angle of the target from reference $\phi$; Δα; ΔR, R and "g" at various lock-on ranges by meters 371, 372, 373, 374, 376, and 343 respectively. As explained above, Δα is the error in the computed line-of-sight computed by computer 312. This is obtained by subtracting $\alpha_a$ (obtained from computer 312) from α (obtained from computer 313) by means of differential synchro 377, and converting this Δα angle to a voltage by servo-loop 378 and potentiometer 379. This voltage is amplified by amplifier 381 and drives meter 373.

$\phi$ is the heading of the interceptor referred to line-of-sight and is obtained by subtracting α from B in differential synchro 382. The angle is displayed on meter 371 which may be a calibrated drum dial, by coupling the output of synchro 382 to meter 371 by means of the servo-loop 383.

λ is the heading of the target referenced to the line-of-sight. This angle is obtained by taking the difference between the target's course at any time and the line-of-sight from the interceptor. This difference is obtained by means of torque transmitter synchro 384, the output voltage of which is coupled to meter 372 by synchro receiver 386. The target is programmed on straight line courses or with dog-leg turns which permit constant input values of $\theta$ which may be changed during data processing. R is applied directly to meter 374 from computer 313. ΔR is obtained by applying $R_a$ and R of opposite polarity to summing amplifier 387. The output from amplifier 387 drives meter 376.

Obviously many modifications and variations of the present invention are possible in the light of the above teachings. It is therefore to be understood that within the scope of the appended claims the invention may be practiced otherwise than as specifically described.

What is claimed is:

1. A simulator comprising: target generator means for generating signals which represent an echo signal which would return from a moving target; noise generator means for generating radar noise signals; interceptor generator means for generating signals which represents the motion of an interceptor; object detector simulating means coupled to said target generator means, to said noise generator means and to said interceptor generator means, for simulating an object detector of the type wherein object position data is intermittently acquired; first computer means coupled to said object detector means for generating a first signal proportional to the range between said simulated target and said simulated interceptor, a second signal proportional to the angle of the line-of-sight between said simulated target and said simulated interceptor, and a third signal proportional to the rate of change of the line-of-sight between said simulated target and said simulated interceptor; second computer means coupled to said target generator and to said interceptor position generator for generating fourth and fifth error free signals which are proportional to the range and the angle of the line-of-sight between said simulated target and said simulated interceptor respectively; indicator means coupled to the output of said first and second computers for displaying said fourth signal and the errors in computing said first and second signals; and plotting means coupled to said target generator means and to said interceptor position generator for plotting the positions of said simulated target and interceptor.

2. A vectoring phase simulator comprising: target generator means for generating signals which represent an echo signal which would return from a moving target; noise generator means for generating radar noise signals; interceptor generator means for generating signals which represent the motion of an interceptor; simulated radar means coupled to said target generator means; to said noise generator means and to said interceptor generator means and being responsive to said represented echo signals and said interceptor represented signals to simulate detecting said simulated target and said simulated interceptor; first computer means coupled to said simulated radar means for generating a first signal proportional to the range between said simulated target and said simulated interceptor, a second signal proportional to the angle of the line-of-sight between said simulated target and said simulated interceptor, and a third signal proportional to the rate of change of the line-of-sight between said simulated target and said simulated interceptor; said first and third signals being coupled as inputs to said interceptor generator means for controlling the operation thereof; second computer means coupled to said target generator and to said interceptor position generator for generating fourth and fifth error free signals which are proportional to the range and the angle of the line-of-sight between said simulated target and said simulated interceptor; indicator means coupled to the output of said first and second computer means for comparing the operations thereof; and plotting means coupled to said target generator means and to said interceptor position generator for plotting the positions of said simulated target and interceptor.

3. A vectoring phase simulator comprising: target generator means for generating signals which represent an echo signal which would return from a moving target; noise generator means for generating radar noise signals; interceptor generator means for generating signals which represent the motion of an interceptor; simulated radar means coupled to said target generator means, to said noise generator means and to said interceptor generator means and being responsive to said represented echo signals and said interceptor represented signals to simulate detecting said simulated target and said simulated interceptor; first computer means coupled to said simulated radar means for generating a first signal proportional to the range between said simulated target and said simulated interceptor, a second signal proportional to the angle of the line-of-sight between said simulated target and said simulated interceptor, and a third signal proportional to the rate of change of the line-of-sight between said simulated target and said simulated interceptor; said first and third signals being coupled as inputs to said interceptor generator means for controlling the operation thereof; second computer means coupled to said target generator and to said interceptor position generator for generating fourth and fifth error free signals which are proportional to the range and the angle of the line-of-sight between said simulated target and said simulated interceptor; first indicator means coupled to said interceptor position generator for displaying the turning rate of said simulated interceptor; second indicator means coupled to said interceptor position generator and to said second computer means for displaying the heading angle of said simulated target from reference; third indicator means coupled to a reference signal and to said second computer means for displaying the heading angle of the target from the line-of-sight between said simulated target and interceptor; fourth indicating means coupled to said second computer means for displaying said first signal; fifth and sixth indicator means for displaying the errors in computing said first and second signals; and plotting means coupled to said target generator means and to said interceptor position generator for plotting the positions of said simulated target and interceptor.

4. The simulator of claim 3 wherein switch means is provided for disconnecting said simulated radar from said interceptor position generator and coupling VOR-DME equipment between said first computer means and said interceptor position generator whereby the determination of an interceptor's position by airborne equipment may be simulated.

5. The simulator of claim 3 wherein said interceptor position generator comprises circuit means for converting said third signal to a signal representing the turning rate of an aircraft, velocity servo integrating means coupled to said circuit means for converting said turning rate signal to a signal representing aircraft heading and sine-cosine potentiometer means for resolving said aircraft heading signal into signals representing rectangular coordinates of said aircraft heading.

6. A simulator comprising: circuit means for converting an input signal voltage representing the rate of change of a line-of-sight into a signal voltage representing the turning rate of an aircraft, a servo-mechanism and motor-tachometer for converting said turning rate signal voltage to a signal voltage representing the heading of said aircraft, and resolver means for resolving said aircraft heading signal voltage to signal voltages representing the rectangular coordinates of said aircraft heading.

7. The simulator of claim 6 wherein said resolver means includes a sine-cosine potentiometer directly connected to the motor-tachometer set.

8. The simulator of claim 6 wherein said circuit means comprises a wave shaping circuit for modifying a signal voltage applied thereto to represent the motion of an aircraft, said modified signal being coupled to drive a motor-tachometer set, whereby said tachometer generates a voltage proportional to the rate of turn of said aircraft.

9. The simulator of claim 6 wherein said means for converting said turning rate signal voltage to a signal voltage representing the aircraft heading is a velocity servo comprising a modulator, amplifier, and motor-tachometer set.

References Cited in the file of this patent
UNITED STATES PATENTS

| | | |
|---|---|---|
| 2,532,158 | Ewing | Nov. 28, 1950 |
| 2,889,636 | Van Alstine | June 9, 1959 |
| 2,929,157 | Johnson | Mar. 22, 1960 |